(12) United States Patent
Ebner et al.

(10) Patent No.: US 6,854,965 B2
(45) Date of Patent: Feb. 15, 2005

(54) BRUSH MAKING MACHINE

(75) Inventors: Winfried Ebner, Emmendingen (DE); Michael Schmidt, Emmendingen (DE); Alexander Senn, Freiburg (DE)

(73) Assignee: Zahoransky Formenbau GmbH, Freiburg (DE)

( * ) Notice: Subject to any disclaimer, the term of this patent is extended or adjusted under 35 U.S.C. 154(b) by 201 days.

(21) Appl. No.: 10/351,933

(22) Filed: Jan. 27, 2003

(65) Prior Publication Data

US 2003/0170339 A1 Sep. 11, 2003

(30) Foreign Application Priority Data

Jan. 29, 2002 (DE) .......................... 102 03 534
Feb. 27, 2002 (DE) .......................... 102 08 599

(51) Int. Cl.[7] .............................................. B29C 45/06
(52) U.S. Cl. .................... 425/120; 425/123; 425/126.1; 425/130; 425/556
(58) Field of Search ................. 425/120, 123, 425/126.1, 556, 130; 264/334, 328.8

(56) References Cited

U.S. PATENT DOCUMENTS

| | | | | |
|---|---|---|---|---|
| 5,609,890 A | * | 3/1997 | Boucherie | ............... 425/120 |
| 6,379,139 B1 | * | 4/2002 | Boucherie | ............. 425/129.1 |
| 6,447,280 B1 | * | 9/2002 | Grimm | ................. 425/116 |
| 6,733,264 B2 | * | 5/2004 | Boucherie | ............... 425/134 |
| 6,783,346 B2 | * | 8/2004 | Bodmer et al. | .......... 425/112 |

FOREIGN PATENT DOCUMENTS

DE 200 07 304 U 1 9/2001

* cited by examiner

*Primary Examiner*—Tim Heitbrink
(74) *Attorney, Agent, or Firm*—Volpe and Koenig, P.C.

(57) ABSTRACT

A brush manufacturing machine having an injection mold is used to manufacture multi-component brush elements made of plastic, in particular for toothbrushes. The injection mold has a nozzle-side mold plate and an ejector-side mold plate, in which mutually allocated mold cavities (8) are provided, the injection mold being formed as a turning tool, having a turning part (index plate) that can be rotated about an axis of rotation and that is allocated to the ejector-side mold plate (3), said turning part having partial cavities (8*b*) of the mold cavities of the ejector-side mold plate (3). The turning part, formed as an index plate (4), has at least three carrier arms (11) that have the partial cavities (8*b*) and that are situated approximately radially in relation to the axis of rotation (14) of the rotatable turning part. The mold cavities (8) are situated with their longitudinal extension approximately tangential to the axis of rotation (14). This arrangement of the mold cavities results in a small space requirement, even given a large number of mold cavities, so that despite a high number of mold cavities, comparatively small injection-molding machines can be used, with a corresponding cost advantage. A brush element delivery station (7) is accessible when the mold is closed for a removal of brush elements (9). In this way, the time required for the injection process or processes is simultaneously also exploited in order to cool and to remove the brush elements.

14 Claims, 3 Drawing Sheets

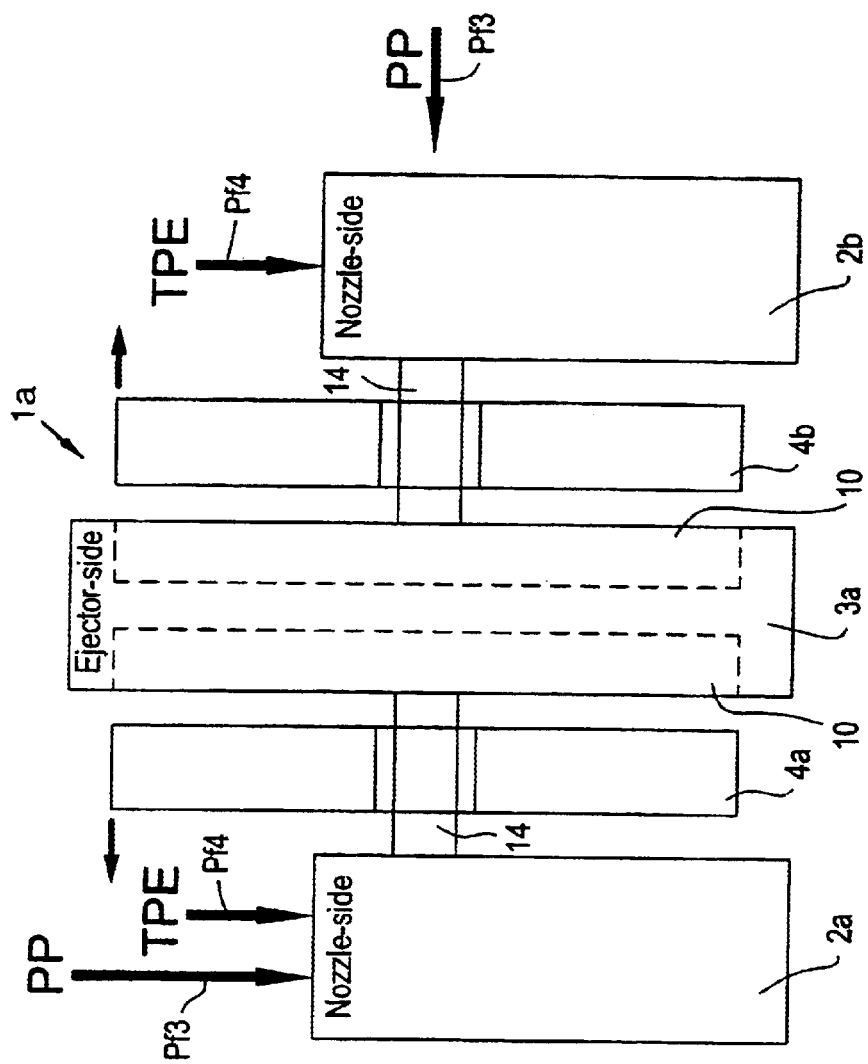

BRUSH MAKING MACHINE

BACKGROUND

The invention relates to a machine for manufacturing brushes, having an injection mold for manufacturing multi-component brush elements from plastic, in particular for toothbrushes, the injection mold having a mold plate at the nozzle side and at the ejector side, in which mutually allocated mold cavities are provided, the injection mold being formed as a turning tool having a turning part (index plate) that can rotate about an axis of rotation and that is allocated to the ejector-side mold plate, and that has partial cavities of the mold cavities of the ejector-side mold plate.

From DE 200 07 304 U1, an injection-molding machine is known that has an injection mold of the type indicated above. This known injection mold is formed as a turning tool, so that in a first injection process a basic toothbrush element can be executed, and in a second injection process an extrusion coating of this basic element can be executed in order to form a finished toothbrush element.

The known injection mold has groups of mold cavities in the mold plates and in the turning part, which are all situated with their longitudinal extensions parallel to one another.

This arrangement of the mold cavities is intended to enable a more compact arrangement in comparison with an arrangement of the mold cavities in which mold cavities point radially away from the center of rotation.

Nonetheless, this results in a comparatively large space requirement, so that the space available between the beams of the injection-molding machine allows only a comparatively small number of mold cavities to be situated there.

After the injection processes, the mold is opened and the injection-molded articles are transferred with the aid of the turning part. Here, the basic elements are transferred to the subsequent extrusion coating station, and the finished injection-molded articles are removed from the extrusion coating station, or are supplied to a cooling and removal station. Here the cycle time is made up of the time in which the mold is closed and the time in which the mold is open. During the open time, the injection-molded articles are transferred and finished brush elements are removed. This means that the mold cannot be closed again until the finished brush elements have been removed from the mold. In the manufacture of toothbrush elements, standard cycle times are approximately 30 to 35 seconds.

SUMMARY

The object of the present invention is to create a brush manufacturing machine having an injection mold, with which an increased number of plastic parts can be manufactured during the individual work passes, without having to use larger injection-molding machines for this purpose. In addition, the possibility of shortening the cycle time is also an intended result.

The solution of this problem according to the present invention is that the turning part, formed as an index plate, is formed with at least three arms that are situated approximately radially in relation to the axis of rotation of the rotatable turning part and that have partial cavities, and that the mold cavities are situated with their longitudinal extension approximately tangential to the axis of rotation. Due to this arrangement of the mold cavities, the space requirement is small even given a large number of mold cavities, so that despite a large number of mold cavities it is possible to use comparatively small injection-molding machines, with a corresponding cost advantage.

In this way, for a given external diameter, which is determined by the spacing of the beams of the injection-molding machine, it is possible to house a significantly greater number of mold cavities than was possible in previous injection-molding tools. For example, it is possible to provide 24 mold cavities, so that each carrier arm of the index plate has 24 partial cavities.

In order to be able to provide as many partial cavities, and thus also mold cavities, as possible in relation to the length of the carrier arms, each carrier arm of the index plate preferably has two parallel rows of partial cavities situated next to one another in the radial direction, the partial cavities of the two rows being situated in mirror-symmetrical fashion to one another.

In particular, the partial cavities in the carrier arms are fashioned for the forming of brush areas having holes for bundles of bristles, hole pins being provided in order to form these bristle bundle holes, said pins simultaneously serving as holding elements for the connection with the respective carrier arm.

With the aid of the hole pins, the injection-molded articles can be held securely, so that no additional elements, and no corresponding expense, are required for this purpose.

A particularly advantageous embodiment, for which independent protection is claimed, provides that the injection mold has at least three stations—namely, one for the injection-molding of basic elements, at least one for the extrusion coating of the basic elements, and a station for the cooling and delivery of brush elements, and that the brush element delivery station is accessible for a removal of brush elements when the mold is closed. In this way, it is possible to remove brush elements when the mold is closed during the injection process.

Thus, the time required for the injection process or processes is simultaneously also used to cool and to remove the brush elements. The exchanging process, in which injection-molded basic elements are transferred into the following extrusion coating station, thus occupies very little time, approximately three seconds sufficing for the opening, the further rotation of the index plate, and the closing of the mold.

Trials have shown that in this way approximately 5 seconds can be saved per cycle time in comparison with the previous cycle times. Given a 10 hour operation of the injection-molding machine, using the machine according to the present invention up to 1440 cycles are possible, whereas using previous machines up to approximately 1200 cycles are possible. The difference of 240 cycles multiplied by the number of brush elements manufactured per cycle, for example 24 brush elements, results in 5760 brush elements more within the assumed operating time of 10 hours.

In connection with the significantly better use of space, or the greater number of mold cavities given the predetermined space conditions, there results in this way a machine that operates in a particularly economical manner.

It contributes to a short cycle time if the index plate(s) can be disengaged from the ejector-side mold plate during the opening of the mold, after a part of the overall opening path is traversed during the opening movement, and if, after the disengagement and the release of the index plate, this plate can be coupled with the rotational drive for the turning pivoting motion.

During the opening of the mold, the index plate thus does not travel concomitantly over the complete opening path and back again into a release position, but rather travels over only a partial region of the overall opening path of the ejector-side mold plate, until the injection-molded articles are demolded at the nozzle-side mold plate, and is already released in the intermediate position provided. The ejector-side mold plate continues its opening motion so that a separation of this mold plate and the index plate takes place. As soon as the index plate is free, it can be rotated. The removal of the index plate from the mold plate, and the turning rotational motion of the index plate, thus takes place within the time required for the opening of the mold.

Additional constructions of the invention are recited in the further dependent claims.

BRIEF DESCRIPTION OF THE DRAWINGS

In the following, the invention is explained in its essential details, with reference to the drawings.

Shown schematically are:

FIG. 3 is a schematic view of a mold formed as a stack mold.

DETAILED DESCRIPTION OF THE PREFERRED EMBODIMENT

Figure 1:
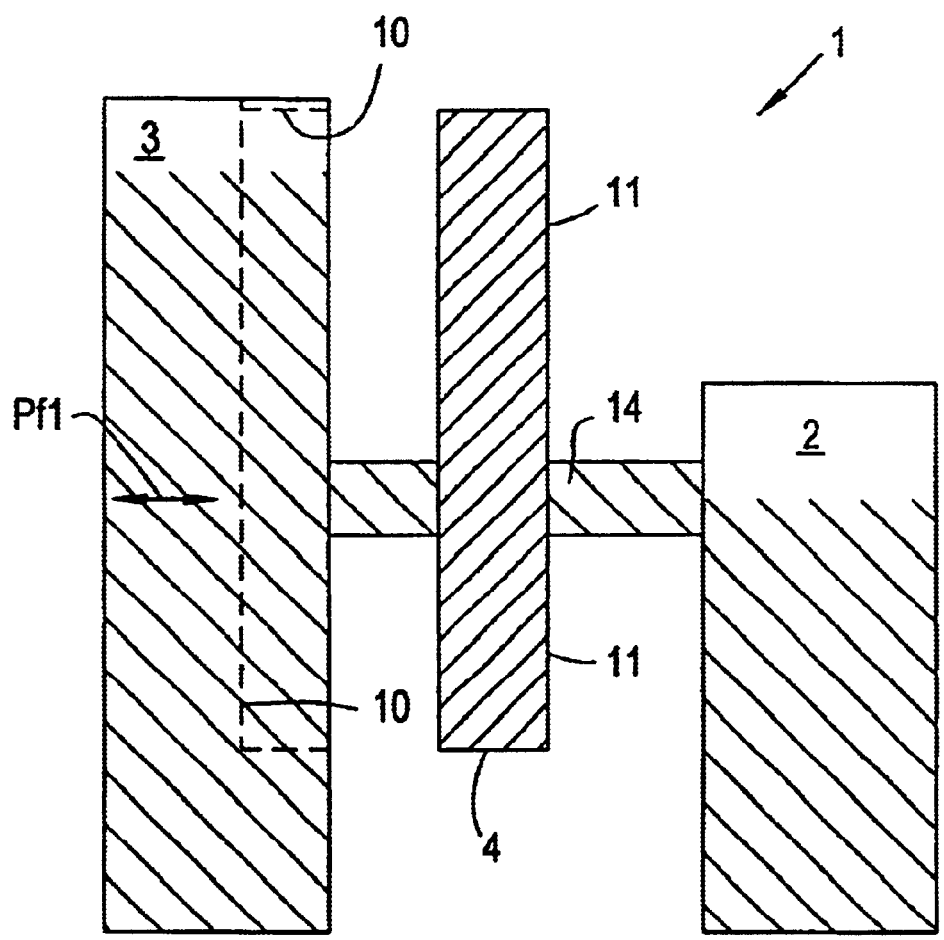
FIG. 1 is a side view of a mold of an injection-molding machine, in the open state.

FIG. 1 shows the opened mold 1 of an injection-molding machine, with a nozzle-side mold plate 2, an ejector-side mold plate 3, and an index plate 4, in the extended position, as a turning part. This is a rotating tool with which multi-component brush elements made of plastic, in particular for toothbrushes, can be injection-molded.

Figure 2:
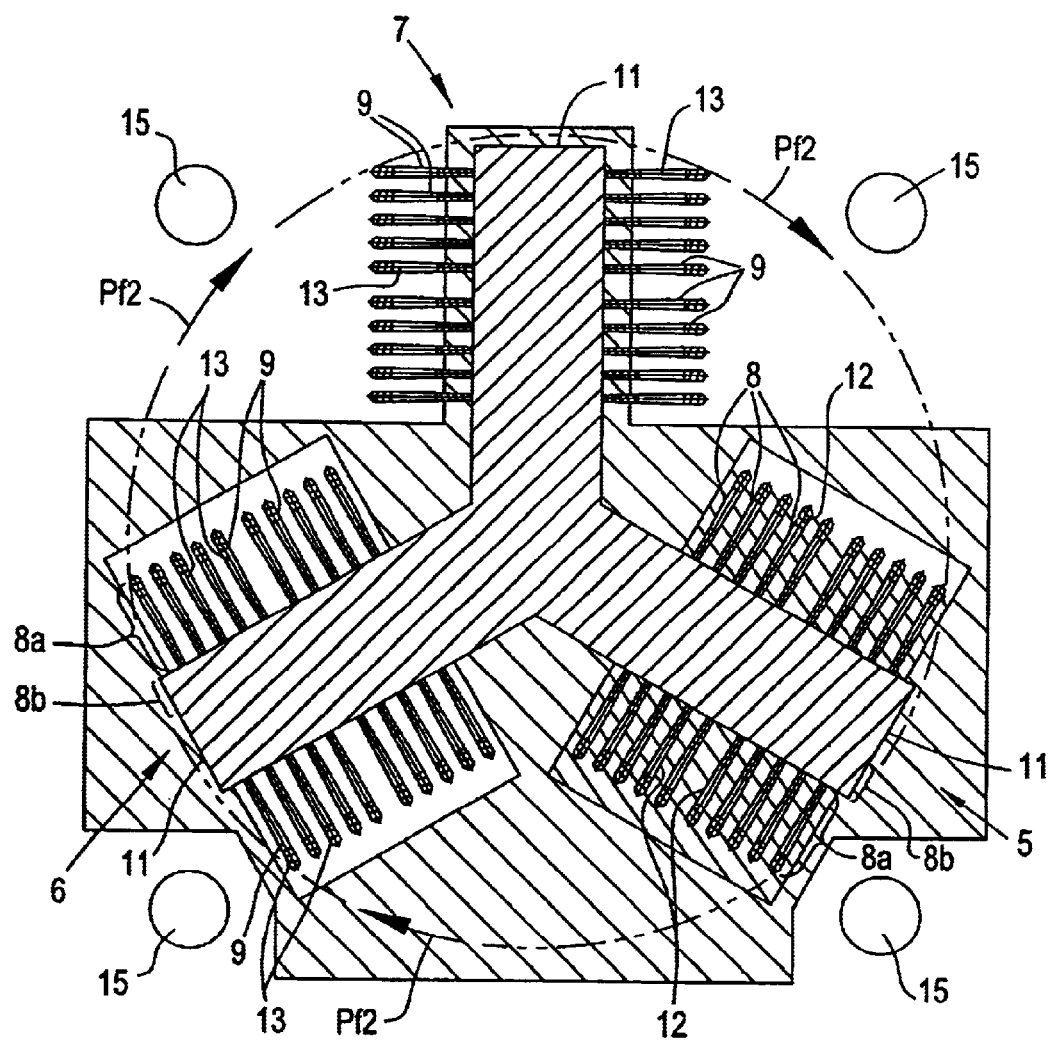
FIG. 2 is an inner side view of an ejector-side mold plate, with index plate placed therein.

As can be seen in FIG. 2, for this purpose there are provided a first station 5 for the injection-molding of basic elements, a second station 6, rotated by 120° in relation to the first station, for the extrusion coating of the basic elements, and a brush element delivery station 7, again rotated by 120° to the second station, at which finished brush elements can be removed.

In the fixed, nozzle-side mold plate 2, and in mold plate 3, which can be moved according to double arrow PF 1 for the opening and closing of the mold, mold cavities 8 situated opposite one another are provided that are adjacent to the mold hollow spaces for brush elements 9 when the injection mold is closed.

In FIG. 2, mold cavities 8 in the movable part of the mold can be seen. These mold cavities 8 are made up of a mold cavity region 8a in movable mold plate 3 and a partial cavity 8b in index plate 4.

The star-shaped, three-armed index plate 4 can be moved into a receiving recess 10 (FIG. 1) of mold plate 3, so that partial mold cavities 8a and 8b are situated flush with one another, and together form mold cavities 8.

Partial cavities 8b in carrier arms 11 of index plate 4 are fashioned for the forming of toothbrush heads or partial areas thereof, and have hole pins for the formation of holes for bundles of bristles. These hole pins simultaneously act as holding elements for connecting basic elements 12 that were injection-molded in first station 5, or finished injection-molded articles 13 in second station 6 or in brush element delivery station 7.

For a turning process, index plate 4 can be moved out of receiving recess 10 of mold plate 3, as shown in FIG. 1. In this position, a turning motion then takes place through rotation of index plate 4 about an axis of rotation 14. The turning motion is indicated by arrows PF 2 in FIG. 2. In the three-armed embodiment of index plate 4, each rotational motion takes place by 120°, so that the injection-molded basic elements 12 are then located in second station 6, and the finished injection-molded articles from station 6 are located in delivery station 7.

Individual carrier arms 11 of index plate 4 extend in the radial direction outwardly from the axis of rotation 14, with the mold cavities 8 or partial cavities 8b being situated tangential to the axis of rotation, and thus running at right angles to the longitudinal extension of radially oriented carrier arms 11. In the exemplary embodiment, two rows of partial cavities 8b, situated in parallel alongside one another in the radial direction, are provided, pointing towards one another in mirror-symmetrical fashion. In the exemplary embodiment, where toothbrush elements are injection-molded, and in partial cavities 8b of the brush heads thereof, the brush head ends of the two parallel rows of each carrier arm point towards one another. In this way, a large number of mold cavities 8 can be housed in the provided space. This space is predetermined by the spacing of the guide beams 15 of the injection-molding machine, shown in FIG. 2.

For the rotational motion of the index plate according to arrows PF 2, a rotational drive is provided, and for the motion in and out of the index plate in the direction of axis of rotation 14, a lift drive is provided.

When the mold is opened, index plate 4 is first mechanically carried along until it reaches the position shown in FIG. 1, and then, as the mold is further opened, moves out of receiving recess 10 of mold plate 3. Here, the injection-molded brush elements remain connected with index plate 4 via the hole pins, and are moved in this way out of partial mold cavities 8a, and out of the mold cavities in the nozzle-side mold plate.

Already during the opening motion of the ejector-side mold plate, in the position shown in FIG. 1, the index plate 4 can be further rotated, so that the time required for the opening of the mold is simultaneously used for the separation of mold plate 3 and index plate 4, as well as for a turning rotational motion of index plate 4.

For the carrying along and releasing of index plate 4 in the provided turning position, a coupling (not shown in the exemplary embodiment) can be provided.

In the exemplary embodiment, the three carrier arms 11 and mold plates 2 and 3 have at each station twenty mold cavities 8, so that twenty basic elements or finished injection-molded articles can simultaneously be manufactured in one injection process.

A particular feature of the machine according to the present invention is that when the mold is closed brush element delivery station 7 is accessible for a removal of brush elements 13. For this purpose, nozzle-side mold plate 2 is provided with an opening in the area of delivery station 7, so that the brush elements in delivery station 7 are openly accessible at one side.

Ejector-side mold plate 3 also need not have any partial mold cavities 8a in the area of delivery station 7. It would thus be sufficient for the brush elements to be held by the index plate and the hole pins alone, and then to eject the brush elements by withdrawing the hole pins.

The accessibility of the finished brush elements in the area of the delivery station 7 when the mold is closed has the considerable advantage that the closing time of the mold is also simultaneously available for the cooling and removal of finished brush elements at the delivery station 7. This achieves a significant reduction of the cycle time, resulting in a substantially more economical operation of the injection-molding machine.

The arrangement in which one side is open in the area of the delivery station is promoted by the star-shaped construction of the index plate 4. As mentioned previously, in the area of the delivery station 7 it would be sufficient to hold the finished brush elements in the area of the partial cavities inside the carrier arms 11 of the index plate. However, if necessary it can be advantageous if in this area ejector-side mold plate 3 has mold cavities that receive the brush elements from one side, at least in areas. In this way, the finished brush elements, which are still somewhat unstable after the injection-molding process, are held not only in the head area but at least partially also in the adjacent shaft area, so that an undesired deformation is reliably avoided during the cooling phase.

In the exemplary embodiment shown, the mold plate 3 has in the area of the delivery station 7 a part of the mold cavity areas 8a that extends approximately over the throat area of the brush element, and partly into the area of the handle. In this way, this somewhat narrower part of the brush element is sufficiently supported.

The remaining areas of the brush elements remain exposed, so that air for cooling, and possibly cooling air supplied specifically for this purpose, can enter.

In the area of the delivery station 7, a device for drawing the hole pins is usefully provided in order to release the finished brush elements after the cooling, as well as, if necessary, another ejector device with which the released brush elements can also be removed in an orderly fashion.

In FIG. 3, a mold 1a according to the present invention in accordance with stacked technology is shown. This stacked mold 1a has a central mold plate 3a at the ejector side, to which the nozzle-side mold plates 2a, 2b are allocated on both sides in practically mirror-symmetrical fashion. The ejector-side mold plate 3a is formed in order to receive two index plates 4a, 4b that can be rotated about the axis of rotation 14. The supplying of the injection material components takes place both at the nozzle-side mold plate 2a and at the nozzle-side mold plate 2b, as is indicated by arrows PF 3 and 4. In addition to PP (polypropylene) or TPE (thermoplastic elastomer), other plastic materials can also be used.

In this stacked mold, no molten plastic is found in the center block, which considerably simplifies the construction. Here it is not necessary to guide molten plastic through the mold plates.

The stacked mold 1a has a fixed, nozzle-side mold plate, e.g. 2b. The other mold parts 2a, 4a, 3a, 4b can be moved away from this stationary mold plate 2b in order to open the mold.

Here as well, already during the opening motion index plates 4a, 4b can be moved out of the central mold plate 3a and can then be further rotated, while the remaining mold parts are moved further into a final opening position. In this way, in the stacked mold as well the time required for the opening of the mold is simultaneously used to separate the mold plates and the index plates, and for a rotational turning motion of the index plates.

The remainder of the construction corresponds to the design shown in FIGS. 1 and 2, in particular with respect to the construction of index plates 4a, 4b, and the arrangement of the mold plates.

Through the use of a stacked mold, the considerably reduced idle times have an even more advantageous effect.

Moreover, in a stack mold it is possible, for example if there is a problem with the heating duct, to remove the defective nozzle side together with the associated index plate for repair, and to continue to operate the rest of the mold as a simple turning tool after the deactivation of the corresponding injection aggregate.

Work can thus continue at half production even in the case of such an abnormal condition.

What is claimed is:

1. Machine for manufacturing brushes, comprising an injection mold for manufacturing multi-component brush elements from plastic the injection mold having a mold plate at a nozzle side and at an ejector side, in which mutually allocated mold cavities (8) are provided, the injection mold being formed as a turning tool having a turning part that can rotate about an axis of rotation and that is allocated to the ejector-side mold plate (3), and having partial cavities (8b) of the mold cavities of the ejector-side mold plate (3), the turning part is formed as an index plate (4) with at least three carrier arms (11) that are situated approximately radially in relation to the axis of rotation (14) of the rotatable turning part and include the partial cavities (8b), and the mold cavities (8) are situated with a longitudinal extension thereof approximately tangential to the axis of rotation (14).

2. Machine as recited in claim 1, wherein each of the carrier arms (11) of the index plate (4) has a plurality of the partial cavities (8b) situated next to one another in a radial direction.

3. Machine as recited in claim 2, each of the carrier arms (11) of the index plate (4) has two parallel rows of the partial cavities (8b) situated next to one another in the radial direction, and that the partial cavities (8b) of the two rows are situated in mirror-symmetrical fashion to one another.

4. Machine as recited in claim 1, wherein the partial cavities (8b) in the carrier arms (11) are fashioned for formation of toothbrush heads or partial regions thereof.

5. Machine as recited in claim 1, wherein the partial cavities (8b) in the carrier arms (11) are fashioned for formation of brush areas having holes for bundles of bristles, and hole pins are provided for the formation of the bristle bundle holes, the pins acting in addition as holding elements for connecting basic elements or finished injection-molded articles (13), with the respective carrier arm (11).

6. Machine as recited in claim 1, wherein the injection mold has at least three stations, comprising one station (5) for the injection-molding of basic elements (12), at least one station (6) for extrusion coating of the basic element, and a station (7) for cooling and delivery of brush elements (9), and that the brush element delivery station (7) is accessible for a removal of brush elements (9) when the mold is closed.

7. Machine as recited in claim 1, wherein in an area of the delivery station (7) at least one of a device for drawing the hole pins and an ejector device on the ejector-side mold plate (3) is provided.

8. Machine as recited in claim 1, wherein the nozzle-side mold plate (2) has an opening in an area of the delivery station (7).

9. Machine as recited in claim 1, wherein the ejector-side mold plate (3) has in an area of the delivery station (7) mold cavities that receive the brush elements (9) from one side at least in areas, in which the brush elements (9) are held open at one side together with the partial cavities (8b) of the carrier arms (11).

10. Machine as recited in claim 1, wherein a multiplicity of partial cavities (8b) are provided on each of the carrier arms (11).

11. Machine as recited in claim 1, the carrier arms (11) are offset by 120° to one another, and each of the arms has a width for receiving one or two rows, extending in a radial direction, of the partial cavities (8*b*), to which the mold cavity areas (8*a*) belonging respectively to the partial cavities (8*b*) are connected in tangential extension in the ejector-side mold plate (3).

12. Machine as recited in claim 1, wherein the index plate (4) is connected with a rotational drive for the turning rotational motion, and with a lift drive for an in-and-out motion into and out of the ejector-side mold plate (3).

13. Machine as recited in claim 1, wherein the mold is formed as a stacked mold having a central, ejector-side mold plate (3*a*) to which mold plates (2*a*, 2*b*) at the nozzle side are allocated at both sides, and having two turning parts (4*a*, 4*b*) that can be rotated about an axis of rotation (14) and that are allocated to the central, ejector-side mold plate (3*a*), each of the turning parts having the partial cavities (8*b*) of the mold cavities of the central mold plate (3*a*).

14. Machine as recited in claim 1, wherein during an opening of the mold, the index plate (4, 4*a*, 4*b*) can be disengaged from the ejector-side mold plate (3, 3*a*), after traversing a part of an overall opening path, and that, after disengaging and release of the index plate, the plate can be coupled with the rotational drive for the turning rotational motion.

* * * * *